United States Patent
Pacher et al.

(10) Patent No.: US 10,108,021 B2
(45) Date of Patent: Oct. 23, 2018

(54) VISUALIZATION SYSTEM FOR THREE-DIMENSIONAL IMAGES

(71) Applicant: Carl Zeiss Vision International GmbH, Aalen (DE)

(72) Inventors: Peter Pacher, Roth (DE); Rainer Sessner, Roth (DE)

(73) Assignee: Carl Zeiss Vision International GmbH, Aalen (DE)

( * ) Notice: Subject to any disclaimer, the term of this patent is extended or adjusted under 35 U.S.C. 154(b) by 88 days.

(21) Appl. No.: 14/495,514

(22) Filed: Sep. 24, 2014

(65) Prior Publication Data

US 2015/0009561 A1     Jan. 8, 2015

Related U.S. Application Data

(63) Continuation of application No. PCT/EP2013/054543, filed on Mar. 6, 2013.

(30) Foreign Application Priority Data

Mar. 30, 2012 (DE) .................. 10 2012 205 271

(51) Int. Cl.
*G02B 27/22* (2018.01)
*G02B 27/26* (2006.01)
(Continued)

(52) U.S. Cl.
CPC ..... *G02B 27/2228* (2013.01); *G02B 27/2214* (2013.01); *G02B 27/2242* (2013.01);
(Continued)

(58) Field of Classification Search
CPC .... G02B 27/2228; G02B 27/22; G02B 27/26; G02B 27/2214; G02B 27/2242; G02B 27/2264
(Continued)

(56) References Cited

U.S. PATENT DOCUMENTS 4,588,259 A * 5/1986 Sheiman ............... G02B 27/26
   348/51
4,744,633 A 5/1988 Sheiman
(Continued)

FOREIGN PATENT DOCUMENTS

DE   10 2008 052 835 A1   4/2010
EP      0 362 692 A2      4/1990
(Continued)

OTHER PUBLICATIONS

International Preliminary Report on Patentability dated Oct. 9, 2014 of international application PCT/EP2013/054543 on which this application is based.
(Continued)

*Primary Examiner* — Ricky Mack
*Assistant Examiner* — Kristina Deherrera
(74) *Attorney, Agent, or Firm* — Walter Ottesen, P.A.

(57) ABSTRACT

A system for stereoscopic visualization of image information includes a display device defining a display area for displaying a left and a right partial image. The display device displays the left partial image to a left eye of an observer focused on the display area in a first viewing direction using a left observation beam path and the right partial image to the right eye in a second viewing direction using a right observation beam path. The system includes a vision assist through which the left and right observation beam paths pass. The vision assist sets a beam course for the left and right viewing observation beam paths wherein, starting from the left and right eyes in a direction toward the display area, a perpendicular distance between the left and right observation beam paths decreases to a minimum at a finite distance from the display surface.

5 Claims, 6 Drawing Sheets

(51) Int. Cl.
*G02C 7/08* (2006.01)
*G02C 7/12* (2006.01)
*G02C 7/14* (2006.01)

(52) U.S. Cl.
CPC ......... *G02B 27/2264* (2013.01); *G02B 27/26* (2013.01); *G02C 7/083* (2013.01); *G02C 7/12* (2013.01); *G02C 7/14* (2013.01)

(58) Field of Classification Search
USPC ........................................................ 359/465
See application file for complete search history.

(56) References Cited

U.S. PATENT DOCUMENTS

| | | | | |
|---|---|---|---|---|
| 5,900,972 | A * | 5/1999 | Chikazawa | G02B 27/2214 348/56 |
| 5,956,180 | A * | 9/1999 | Bass | G02B 27/2278 345/3.1 |
| 6,318,857 | B1 | 11/2001 | Shirayanagi | |
| 7,626,674 | B2 | 12/2009 | Koyama et al. | |
| 7,768,702 | B2 * | 8/2010 | Hirose | A61B 1/00193 359/368 |
| 8,029,139 | B2 * | 10/2011 | Ellinger | G02B 27/2207 353/10 |
| 8,514,272 | B2 | 8/2013 | Reichelt | |
| 8,827,451 | B2 * | 9/2014 | Cabeza Guillen | A61B 3/085 351/201 |
| 2006/0203338 | A1 | 9/2006 | Pezzaniti | |
| 2007/0064311 | A1 * | 3/2007 | Park | G02B 27/0172 359/630 |
| 2007/0075917 | A1 * | 4/2007 | Nishi | A63F 13/08 345/8 |
| 2007/0081126 | A1 | 4/2007 | Blum et al. | |
| 2010/0134602 | A1 * | 6/2010 | Inaba | H04N 13/0434 348/58 |

FOREIGN PATENT DOCUMENTS

| | | |
|---|---|---|
| FR | 2 858 069 A1 | 1/2005 |
| GB | 2 308 677 A | 7/1997 |
| JP | 58-184118 A | 10/1983 |
| JP | 61-261719 A | 11/1986 |
| JP | 08106547 A * | 4/1996 |

OTHER PUBLICATIONS

Muetze, K. et al, "ABC Der Optik", 1972, Verlag Werner Dausien, Hanau/Main, Germany, pp. 135 to 138 and English translation thereof.
International Search Report dated May 21, 2013 of international application PCT/EP2013/054543 on which this application is based.

* cited by examiner

VISUALIZATION SYSTEM FOR THREE-DIMENSIONAL IMAGES

CROSS REFERENCE TO RELATED APPLICATIONS

This application is a continuation application of international patent application PCT/EP2013/054543, filed Mar. 6, 2013, designating the United States and claiming priority from German application 10 2012 205 271.2, filed Mar. 30, 2012, and the entire content of both applications is incorporated herein by reference.

FIELD OF THE INVENTION

The invention relates to a system for stereoscopic visualization of image information. The system has a display device having a display area for displaying a left and right partial image. The display device provides the left partial image to a left eye of an observer focused on the display area in a first viewing direction using a left observation beam path. The right partial image is displayed by the display device to a right eye of the observer focused on the display area in a second viewing direction using a right observation beam path. The system contains a vision aid through which the left and/or right observation beam path(s) travel(s). The invention also relates to a vision aid for such a system. The invention additionally extends to a method for visualizing three-dimensional images.

BACKGROUND OF THE INVENTION

For generating a three-dimensional visual impression of image information in an observer, two partial images having different viewing angles must be displayed to the left and right eyes. This is possible using what are known as stereoscopes, for example. In a stereoscope, there is a display device for a left and a right partial image, which are spatially separated from one another. A stereoscope has an optical assembly acting as a vision aid, through which the observer can view the left and right partial images in one focal plane.

A system for stereoscopic visualization of image information of the type mentioned in the introduction is known from EP 0 362 692 A2. The document describes spectacles for an observer, in which the rigidly connected optical lenses held by a wearer's frame comprise two prisms. The prisms ensure that, when the observer looks at a screen arranged at a finite distance with eyes which are adapted for infinity and a parallel viewing direction, the intersection of the observation beam paths for the left and right eyes of the observer is located in the plane of the screen.

Known systems for visualization of three-dimensional image information face the problem that the distance from a three-dimensional object visualized using the display device as perceived by an observer differs from the distance of the observer eye from that focal plane on which the observer eye is accommodated. In many people, this circumstance causes a state of physical discomfort, in particular dizziness.

SUMMARY OF THE INVENTION

It is an object of the invention to permit an observer to visualize three-dimensional image information with improved visual comfort.

This object is achieved by a system of the type mentioned above, wherein the vision aid adjusts a beam course for the left and right observation beam paths in which, starting from the left and right eyes in the direction of the display area, the perpendicular distance between the left observation beam path, which is extrapolated to infinity, and the right observation beam path, which is extrapolated to infinity, decreases and has a minimum at a location which is at a finite distance from the display area.

The invention is based here on the concept that an observer can observe a three-dimensional object visualized using the system with high vision comfort if the vision aid is used to adjust a stereo angle for the eyes that substantially corresponds to the stereo angle at which the display area of the display device visualizing the three-dimensional object is naturally viewed. In particular, one concept of the invention lies in that if, for the deviation of the intersection of the left and right observation beam paths which are extrapolated to infinity, the position corresponds to a three-dimensional object structure displayed using the display device, a pleasant, relaxed viewing of the object structure is made possible for the observer.

In a further development of the invention, the left observation beam path has a shared intersection with the right observation beam path.

The display device in the system is preferably configured such that the left partial image is generated with a first group of display zones situated within the display area. The right partial image is then generated with a second group of display zones situated within the display area. The left and right partial images are displayed to the left and right eyes using a left and right observation beam path in which an optical assembly is arranged, which splits the light in the left observation beam path coming from the first group of display zones from the light the observation beam path receives from the second group of display zones. Only the light from the first group of display zones is then fed to the left eye. At the same time, the light from the second group of selected display zones in the right observation beam path is split from the light the observation beam path receives from the first group of display zones. The right observation beam path guides the light from the second group of display zones to the right eye. In principle, all known methods for image separation, which are described in detail for example on pages 135 to 138 of the textbook "ABC der Optik", Mütze, Verlag Werner Dausien, 1960, are suitable for splitting the left and right partial images with the stereoscopic image information. Reference is made here in full to the relevant disclosure of this standard reference.

It is expedient if the display device generates the left and right partial images with differently polarized light and the optical assembly contains a first polarization filter, which is used to split the light coming from the first group of display zones in the left observation beam path from the light the left observation beam path receives from the second group of display zones, and has a second polarization filter with which the light coming from the second group of display zones in the right observation beam path is split from the light that is fed to the right observation beam path from the second group of display zones.

However, the display device can also generate the left and right partial images sequentially in time. In this case, the optical assembly contains a first controllable shutter which splits the light fed to the left observation beam path from the first group of display zones from the light the left observation beam path receives from the second group of display zones. The display device in that case also has a second controllable shutter, which splits the light fed to the right observation beam path from the second group of display zones from the light that is made available to the right observation beam path from the first group of display zones.

It is also possible for the optical assembly to have a barrier system acting as a parallax barrier for splitting the light of the first and second groups of selected display zones. The optical assembly can also comprise a prism matrix for splitting the light of the first and second groups of display zones, which prism matrix has a plurality of prism portions extending in a vertical direction which in each case have a preferably lens-shaped, in particular cylindrical lens-shaped, region with a convex surface, which faces the display area.

It is advantageous if the optical assembly is configured to be adjustable and enables variation of the courses of the left and right observation beam paths between the display area and the left and right eyes. An observer can then perceive, at various distances from the display area, stereoscopic image information with a three-dimensional visual impression. Another concept of the invention is the integration of the optical assembly in the vision aid.

The vision aid is preferably also adjustable. It then allows, in dependence on image information displayed on the display device, a variation of the location in the left and right observation beam paths at which the perpendicular distance between the left observation beam path, which is extrapolated to infinity, and the right observation beam path, which is extrapolated to infinity, is at a minimum. By adjusting the vision aid, an observer can then see even displayed three-dimensional structures which have varying distances from the display area in a relaxed manner using the system.

It is advantageous if the vision aid is to this end connected to a control device with which the distance of the location in the left and right observation beam paths from the display area, at which the perpendicular distance between the left observation beam path, which is extrapolated to infinity, and the right observation beam path, which is extrapolated to infinity, is at a minimum, can be adjusted in dependence on the image information displayed on the display device. In this manner, relaxed perception of the image information is made possible in particular in the case of a three-dimensional structure moving in the space. One particular idea of the invention is to adjust the horizontal prismatic effect $(P_{132}, P_{134})$ of the vision aid in the left and right observation beam paths as follows:

$$P_{132} = 100 \frac{cm}{m} \tan\left\{\arctan\left(\frac{P_D}{2D}\right) - \arctan\left(\frac{P_D}{2E}\right)\right\} \approx 100 \frac{cm}{m} \frac{P_D}{2} \left\{\frac{1}{D} - \frac{1}{E}\right\}$$

$$P_{134} = 100 \frac{cm}{m} \tan\left\{-\arctan\left(\frac{P_D}{2D}\right) + \arctan\left(\frac{P_D}{2E}\right)\right\} \approx -100 \frac{cm}{m} \frac{P_D}{2} \left\{\frac{1}{D} - \frac{1}{E}\right\},$$

wherein $P_D$ is the pupillary distance between the eyes of the observer, E is the distance from the display area and D is the distance of a three-dimensional structure displayed using the display device from the eyes of the observer. It is also an idea of the invention to integrate the optical assembly in the vision aid.

One idea of the invention in particular is to configure the vision aid in the system for visualizing three-dimensional image information in the form of spectacles. Advantageously, the spectacles contain spectacle lenses having a mutually opposite prismatic effect. Since the horizontal prismatic effect of the spectacle lenses can be adjusted, it is possible for an observer to view three-dimensional structures on a display area in a relaxed manner, the deviation of which from the display area being variable. In order to enable relaxed viewing of three-dimensional structures at various distances from the display area, it is advantageous if a distance meter coupled to the control device is integrated in the spectacles so as to use it to adjust the prismatic effect of the spectacle lenses and advantageously their refractive powers or other optical parameters in dependence on the distance of the eyes of the observer from the display area.

Since the spectacles cover the eye sockets of a spectacles wearer in the manner of sports goggles or protective goggles, the three-dimensional image information can be visualized in a wide field of vision on an expanded display area. To this end, the spectacle lenses of the spectacles for the left and right observation beam paths are configured in a favorable manner at least approximately with a horizontal base curve, wherein the following applies to the average curvature κ: κ≥6 dpt.

In the method according to the invention for visualizing three-dimensional image information, a display device having a display area for displaying a left and right partial image is used to make available to a left eye of an observer a left partial image in a first viewing direction using a left observation beam path, and a right partial image in a second viewing direction is displayed to a right eye using a right observation beam path. The beam courses for the left and right observation beam paths are here adjusted such that, proceeding from the left and right eyes in the direction of the display area, the perpendicular distance between the left observation beam path, which is extrapolated to infinity, and the right observation beam path, which is extrapolated to infinity, decreases and has a minimum at a location which is at a finite distance from the display area, that is, has a minimum at a location in the left and right observation beam paths which has a finite distance from the display area.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
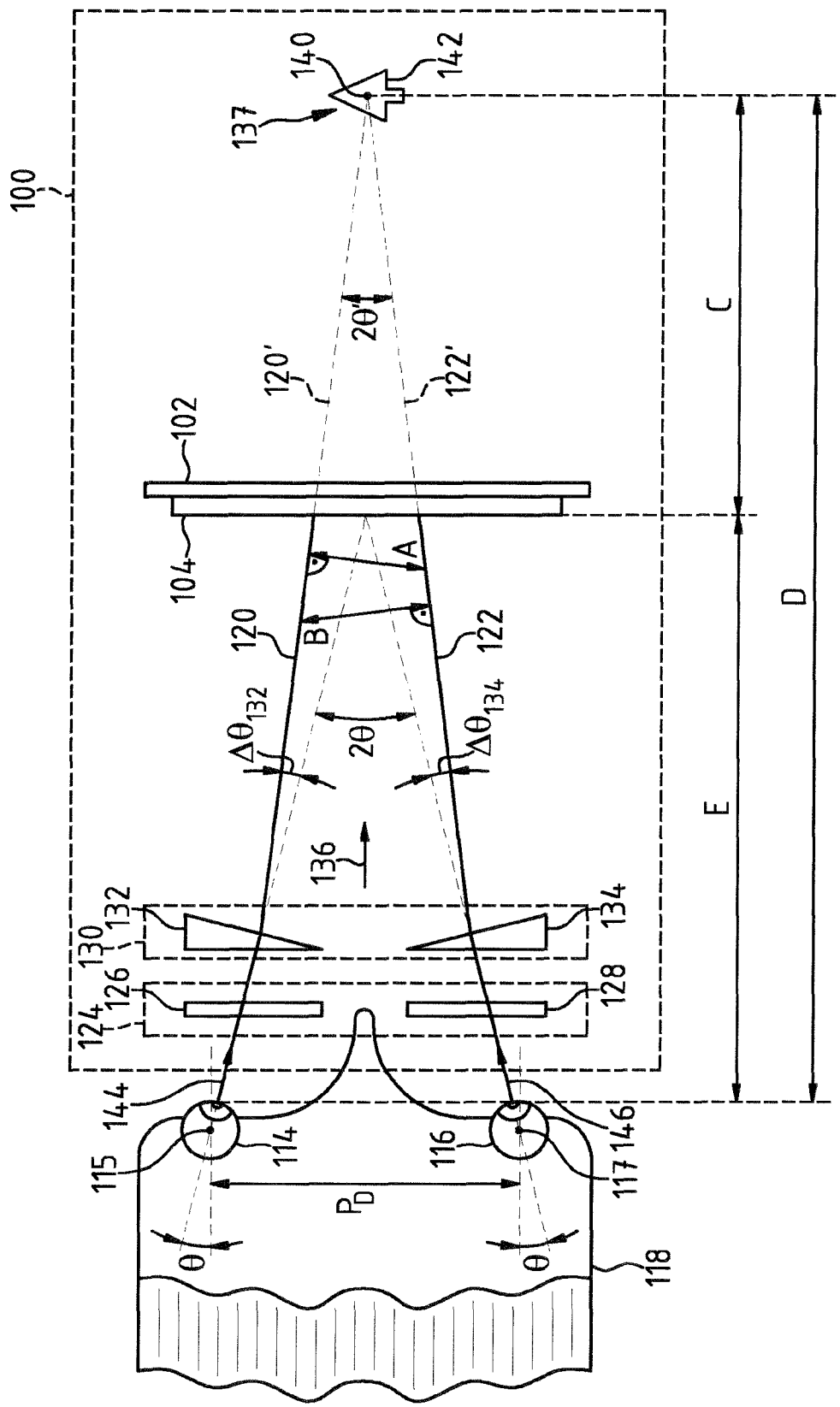
FIG. 1 shows a first system for stereoscopic visualization of three-dimensional image information using polarized light on a display area.

FIG. 1 shows a system 100 for stereoscopic visualization of image information. The system 100 has a display device 102 having a display area 104. The display device 102 contains a dual-layer LCD display. Such a dual-layer LCD display can have a construction which corresponds to the LCD displays described in detail by way of figures in United States patent application publication 2006/0203338 A1. For the construction of the dual-layer LCD display in the display device 102, full reference is therefore made to the relevant disclosure of United States patent application publication 2006/0203338 A1 which is incorporated herein by reference.

Figure 2:
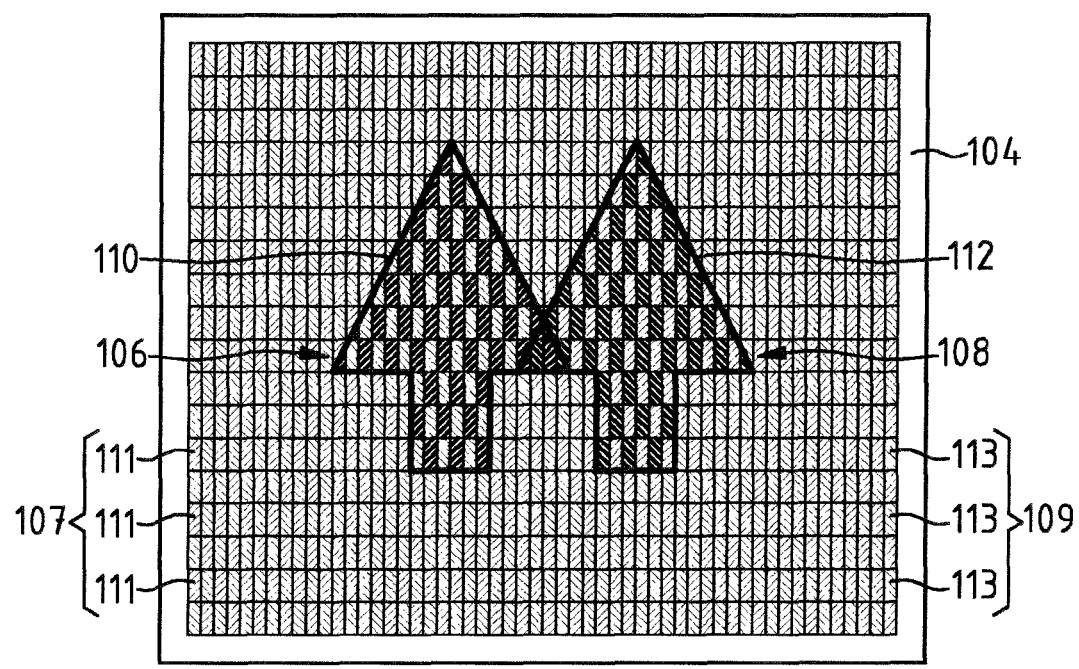
FIG. 2 shows the display area of a display device in the first system.

FIG. 2 shows the display area 104 of the display device 102 in plan view. The display device 102 generates a left stereoscopic partial image 106 and a right stereoscopic partial image 108 in the display area 104. The left partial image 106 is built with a first group 107 of display zones 111 with image points 110 of the dual-layer LCD display which emit horizontally polarized light. The right partial image 108 consists of a second group 109 of image points 112 of the dual-layer LCD display in display zones 113 which emit vertically polarized light.

The system 100 can be used to display the left and right partial images (106, 108) with a left and right observation beam path (120, 122) to a left and right observer eye (114, 116) of an observer 118 having the pupillary distance $P_D$ with respect to the eyes' centers of rotation (115, 117).

The system 100 includes an optical assembly 124 having a polarization filter 126, which is transmissive for the horizontally polarized light from the image points 110 of the left partial image 106, and having a polarization filter 128 for the vertically polarized light from the image points 112 of the right partial image 108. The polarization filter 126 is non-transmissive for the light from the image points 110 of the left partial image 106. The light from the image points 112 of the right partial image 108 is correspondingly blocked using the polarization filter 128. The optical assembly 124 is arranged in the left and right observation beam paths (120, 122).

The optical assembly 124 in the system 100 splits the light from the image points 110 of the dual-layer LCD display from the light from the image points 112. The optical assembly 124 causes the light from the image points 110 to be supplied to the left observer's eye 114 and causes the right observer eye 116 to receive the light from the image points 112 on the display area 104 of the display device 102.

The system 100 includes a vision aid 130. The vision aid 130 has an optical element in the form of a first prism 132 and has an optical element in the form of a second prism 134. The vision aid 130 is arranged in front of the observer eyes (114, 116) of the observer 118. The vision aid 130 is used to adjust, for the left and right observation beam paths (120, 122), a beam course in which, proceeding from the left and right observer eyes (114, 116) in the direction 136 toward the display area 104, the perpendicular distance (A, B) of the left observation beam path (120, 120'), which is extrapolated to infinity, from the right observation beam path (122, 122'), which is extrapolated to infinity, decreases. At the location 136 in the left and right observation beam paths (120, 122), which location is arranged at a distance from the display area 104 with the perpendicular deviation C, the left observation beam path 120, which is extrapolated to infinity, and the right observation beam path 122, which is extrapolated to infinity, have an intersection 140. The perpendicular distance A of the left observation beam path 120 from the right observation beam path 122 and the perpendicular distance B of the right observation beam path 122 from the left observation beam path 120 here thus exhibit a minimum.

The vision aid 130 can be used by the observer 118 to perceive a structure 142 perceived as a three-dimensional object at the intersection 140 owing to a left and right partial image (106, 108) fusing in his brain. The structure 142 is here observed at an apparent distance D from the observer under a stereo angle 28'. However, the observer eyes (114, 116) are situated with a viewing direction 144 and a viewing direction 146 relative to each other, which corresponds to the stereo angle 28 with which an object, which has the distance E from the observer eyes (114, 116), is focused with a physiologically natural viewing direction (144, 146) on the display area 104.

The prism 132 is used to deflect the left observation beam path 120 by the angle $\Delta\theta_{132}=\theta'-\theta$. The prism 134 changes the direction of the right observation beam path 122 by the angle $\Delta\theta_{134}=\theta-\theta'$.

The prismatic effect $$P_{132} := 100\frac{\text{cm}}{\text{m}}\tan\Delta\theta_{132} \quad (1)$$

of the first prism 132 and the prismatic effect $$P_{134} := 100\frac{\text{cm}}{\text{m}}\tan\Delta\theta_{134} \quad (2)$$

of the second prism 134 in the vision aid 130 are here opposite one another.

In accordance with the invention, for a given distance E of the observer 118 from the display area 104 and a predetermined distance C of a structure 142, which is perceived by the observer 118 on account of fusion of a left and right partial image (106, 108) from the display area 104, the prismatic effect of the prisms (132, 134) is adjusted in accordance with the following stated relationship:

$$P_{132} = 100\frac{\text{cm}}{\text{m}}\tan\left\{\begin{array}{l}-\arctan\left(\frac{P_D}{2D}\right)+\\ \arctan\left(\frac{P_D}{2E}\right)\end{array}\right\} \approx -100\frac{\text{cm}}{\text{m}}\frac{P_D}{2}\left\{\frac{1}{D}-\frac{1}{E}\right\} \quad (3)$$

$$P_{134} = 100\frac{\text{cm}}{\text{m}}\tan\left\{\begin{array}{l}\arctan\left(\frac{P_D}{2D}\right)-\\ \arctan\left(\frac{P_D}{2E}\right)\end{array}\right\} \approx 100\frac{\text{cm}}{\text{m}}\frac{P_D}{2}\left\{\frac{1}{D}-\frac{1}{E}\right\}. \quad (4)$$

wherein: D:=E+C.

With the assumption that the eyesight of the observer 118 is not impaired and he therefore requires no refraction, the observer 118 can then observe the structure 142 with a natural viewing direction (144, 146) corresponding to the focus adjustment of the eyes (114, 116). The approximation stated in the previous equation relationship (3) and (4) is here valid under the assumption that the pupillary distance $P_D$ of the eyes (114, 116) of the observer is small relative to the distances D and E.

For the sake of completeness, it should be noted that it is also possible for the display device 102 to be designed in a manner which is known in principle also for displaying three-dimensional image information using circularly polarized light.

Figure 3:
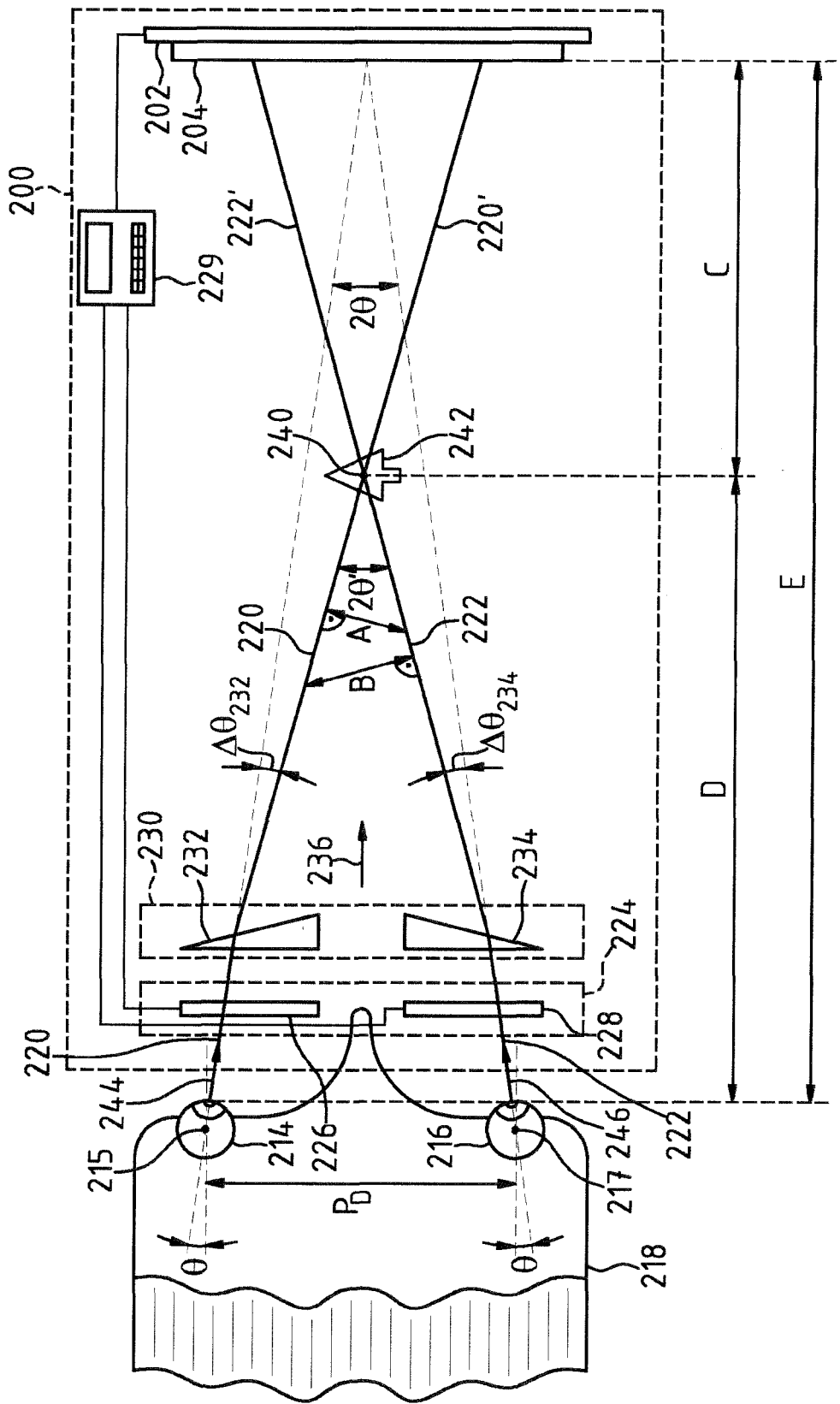
FIG. 3 shows a second system for stereoscopic visualization of three-dimensional image information using pulsed light.

FIG. 3 shows a second system 200 for stereoscopic visualization of image information. To the extent that the construction and the function of the system 200 correspond to the function and construction of the system 100 previously explained with reference to FIGS. 1 and 2, the assemblies and elements illustrated in FIG. 2 have been denoted by reference signs which are increased by the number 100 with respect to FIG. 1.

Figure 4:
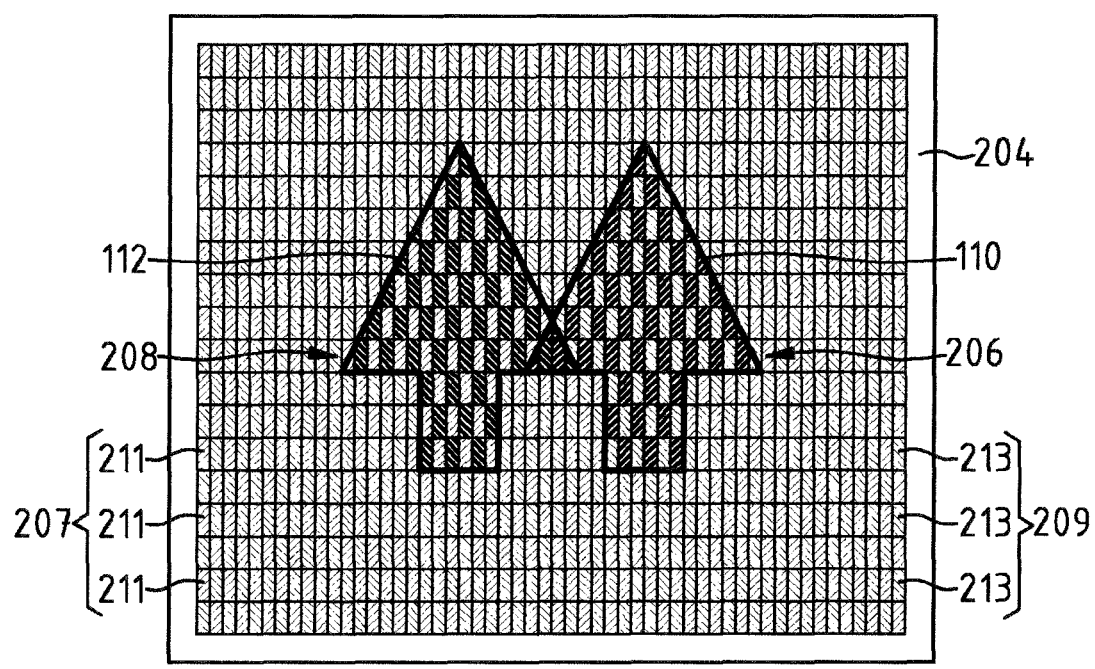
FIG. 4 shows the display area of a display device in the second system.

The system 200 has a display device 202 having a display area 204. FIG. 4 shows the display area 204 of the display device 202 in plan view. The display device 202 generates in the display area 204 a left and right stereoscopic partial image (206, 208) with the image points (210, 212) in an alternating temporally sequential manner. The left partial image 206 is here constructed with a first group 207 of display zones 211 with image points 210 of a TFT display. The right partial image 208 consists of a second group 209 of image points 212 of the TFT display in display zones 213. If the display zones 211 emit light, the display zones 213 do not emit any light. Conversely, the display zones 213 generate light if the display zones 211 are dark.

The system 200 includes an optical assembly 224 with a shutter 226 and a shutter 228. The optical assembly 224 is coupled to the display device 202 using a control device 229. The control device 229 receives information from the display device 202 about the display state of the display zones (211, 213) of the TFT display. On the basis of this information, the shutter 226 and the shutter 228 are adjusted using the control device 229 such that the light from the image points 210 of the left partial image 206 arrives only at the left observer eye 214, and the right observer eye 216 receives only the light from the image points of the right partial image 208. If the image points 210 of the left partial image 206 emit light, the shutter 228 is switched to be non-transmissive for the light and the shutter 226 is opened. Accordingly, the shutter 226 is switched to be non-transmissive if light is emitted from the image points 212 of the right partial image 206. In that case, the shutter 228 is transmissive for this light.

Using the prism 232, the left observation beam path 220 is deflected by the angle $\Delta\theta_{232}=\theta'-\theta$. The prism 234 changes the direction of the right observation beam path 222 by the angle $\Delta\theta_{234}=\theta-\theta'$.

Here, too, the prismatic effect $$P_{232} := 100\frac{cm}{m}\tan\Delta\theta_{232} \quad (5)$$

of the optical element in the form of a first prism 232 is opposite to the prismatic effect $$P_{234} := 100\frac{cm}{m}\tan\Delta\theta_{234} \quad (6)$$

of the second optical element configured as the prism 234 in the vision aid 230.

For a given distance E of the observer 218 from the display area 204 and a predetermined distance C of a structure 242, perceived by the observer 218 on account of fusion of a left and right partial image (206, 208), from the display area 204, the following stated relationship applies to the prismatic effect of the prisms (232, 234) in the system 200:

$$P_{232} = 100\frac{cm}{m}\tan\left\{\begin{array}{c}\arctan\left(\frac{P_D}{2D}\right)- \\ \arctan\left(\frac{P_D}{2E}\right)\end{array}\right\} \approx 100\frac{cm}{m}\frac{P_D}{2}\left\{\frac{1}{D}-\frac{1}{E}\right\}. \quad (7)$$

$$P_{234} = 100\frac{cm}{m}\tan\left\{\begin{array}{c}-\arctan\left(\frac{P_D}{2D}\right)+ \\ \arctan\left(\frac{P_D}{2E}\right)\end{array}\right\} \approx -100\frac{cm}{m}\frac{P_D}{2}\left\{\frac{1}{D}-\frac{1}{E}\right\}. \quad (8)$$

wherein D:=E−C.

Under the assumption that the eyesight of the observer 218 is not impaired and he therefore requires no refraction, the observer 218 can then observe the structure 242 with a viewing direction (244, 246) which corresponds to the focus adjustment of the eyes (214, 216). Here, too, the approximation in the above equation relationships (7) and (8) is valid under the assumption that the pupillary distance $P_D$ of the eyes (114, 116) of the observer is considerably smaller than the distances D and E.

It has been found by the inventors that for the pupillary distance $P_D$=65 mm, which is typical in adults, the accommodation $A_k$ required for sharp viewing of image information on a display area (104, 204) arranged at a distance E from the eyes (114, 116, 214, 216) of an observer (118, 218), which is the change of the refractive power of the eye which is adapted to infinity, and the stereo angle $2\theta$, corresponding to this distance E, with respect to the optical axis of the viewing direction (144, 146, 244, 246) of the left and right eyes (114, 116, 214, 216) have the relationship stated in the following Table 1 with a total prismatic effect $$P := 100\frac{cm}{m}\tan 2\theta \quad (9)$$

which corresponds to the stereo angle $2\theta$:

TABLE 1

| E [m] | $A_K$ [dpt] | P [cm/m] | θ [°] |
|---|---|---|---|
| 15.0 | 0.07 | 0.43 | 0.12 |
| 10.0 | 0.10 | 0.65 | 0.19 |
| 5.0 | 0.20 | 1.30 | 0.37 |
| 3.0 | 0.33 | 2.17 | 0.62 |
| 2.0 | 0.50 | 3.25 | 0.93 |
| 1.9 | 0.53 | 3.42 | 0.98 |
| 1.0 | 1.00 | 6.50 | 1.86 |
| 0.8 | 1.25 | 8.13 | 2.33 |
| 0.5 | 2.00 | 13.00 | 3.72 |
| 0.4 | 2.50 | 16.25 | 4.65 |
| 0.3 | 3.33 | 21.67 | 6.18 |
| 0.2 | 5.00 | 32.50 | 9.23 |

It has been recognized by the inventors, in particular, that a system (100, 200) can enable an observer (118, 218) to observe in a relaxed manner a three-dimensional structure (140, 240) which is displayed in a display area (104, 204) arranged at a distance $E_1$=3.0 m from the observer, which structure is perceived by the observer (118, 218) with a distance $C_1$=1.10 m on that side of the display area (104, 204) which faces the observer (118, 218), which thus has an apparent distance $D_1$=1.90 m from the eyes of the observer (118, 218), if an optical element with a specific prismatic effect ($P_{132,232}$, $P_{134,234}$) is arranged with the vision aid (130, 230) in the left and right observation beam paths (120, 220, 122, 222). It has been discovered that, if the vision aid (130, 230) for the left and right eyes (114, 116, 214, 216) has the prismatic effect ($P_{132,232}$, $P_{134,234}$) derived from Table 2 below, which corresponds to a deflection angle ($\Delta\theta_{132,232}$, $\Delta\theta_{134,234}$) it is made possible for the observer (118, 218) to see in a relaxed manner without fatigue.

TABLE 2

| E [m] | $A_k$ [dpt] | P [cm/m] | θ [°] |
|---|---|---|---|
| 3.0 | 0.33 | 2.17 | 0.62 |
| 1.9 | 0.53 | 3.42 | 0.98 |

$$P_{132,232} := \frac{1}{2}(3.42 - 2.17) = 0.625 \qquad (10)$$

$$P_{134,234} := \frac{1}{2}(2.17 - 3.42) == -0.625 \qquad (11)$$

$$\Delta\theta_{132,232} := \arctan(P_{132,232}) = 0.36° \qquad (12)$$

$$\Delta\theta_{134,234} := \arctan(P_{134,234}) = -0.36° \qquad (13)$$

The distance $E_1=3.0$ m corresponds to a typical distance of an observer from a television set in a living room.

It has also been recognized that therefore, the system (100, 200) can be used to enable relaxed viewing of a three-dimensional structure (140, 240) displayed on a display area (104, 204) arranged at a distance $E_2=0.5$ m from the observer, which structure is situated apparently on that side of the display area (104, 204) which faces the observer (118, 218) at the distance $C_2=-0.40$ m, if the vision aid (130, 230) for the left and right eyes (114, 116, 214, 216) has the prismatic effect ($P_{132,232}$, $P_{134,234}$) derived from Table 3 below.

TABLE 3

| E [m] | $A_k$ [dpt] | P [cm/m] | 2θ [°] |
|---|---|---|---|
| 0.5 | 2.00 | 13.00 | 0.62 |
| 0.40 | 2.50 | 16.25 | 0.98 |

$$P_{132,232} := \frac{1}{2}(16.25 - 13.00) = 1.625 \qquad (14)$$

$$P_{134,234} := \frac{1}{2}(13.00 - 16.25) = -1.625 \qquad (15)$$

$$\Delta\theta_{132,232} := \arctan(P_{132,232}) = 58.39° \qquad (16)$$

$$\Delta\theta_{134,234} := \arctan(P_{134,234}) = -58.39° \qquad (17)$$

The distance $E_2=0.5$ m corresponds to a typical distance of an observer from a display area of a mobile radio telephone the observer holds in his hand.

Furthermore, it has been recognized that therefore the system (100, 200) can be used to enable comfortable viewing of a three-dimensional structure (140, 240) displayed on a display area 104 arranged at a distance $E_3=0.6$ m from the observer, which structure is located apparently at the distance $C_3=-0.83$ m on that side of the display area (104, 204) which faces the observer 118, if the vision aid (130, 230) for the left and right eyes (114, 116, 214, 216) has the prismatic effect ($P_{132,232}$, $P_{134,234}$) derived from Table 4 below.

TABLE 4

| E [m] | $A_k$ [dpt] | P [cm/m] | 2θ [°] |
|---|---|---|---|
| 0.6 | 1.67 | 10.83 | 3.10 |
| 0.3 | 1.21 | 7.83 | 2.24 |

$$P_{132,232} := \frac{1}{2}(10.83 - 7.83) = 1.5 \qquad (18)$$

$$P_{134,234} := \frac{1}{2}(7.83 - 10.83) = -1.5 \qquad (19)$$

$$\Delta\theta_{132,232} := \arctan(P_{132,232}) = 56.31° \qquad (20)$$

$$\Delta\theta_{134,234} := \arctan(P_{134,234}) = -56.31° \qquad (21)$$

The distance $E_3=0.6$ m corresponds to a typical distance of an observer from a display area of a commercial computer monitor.

Figure 5:
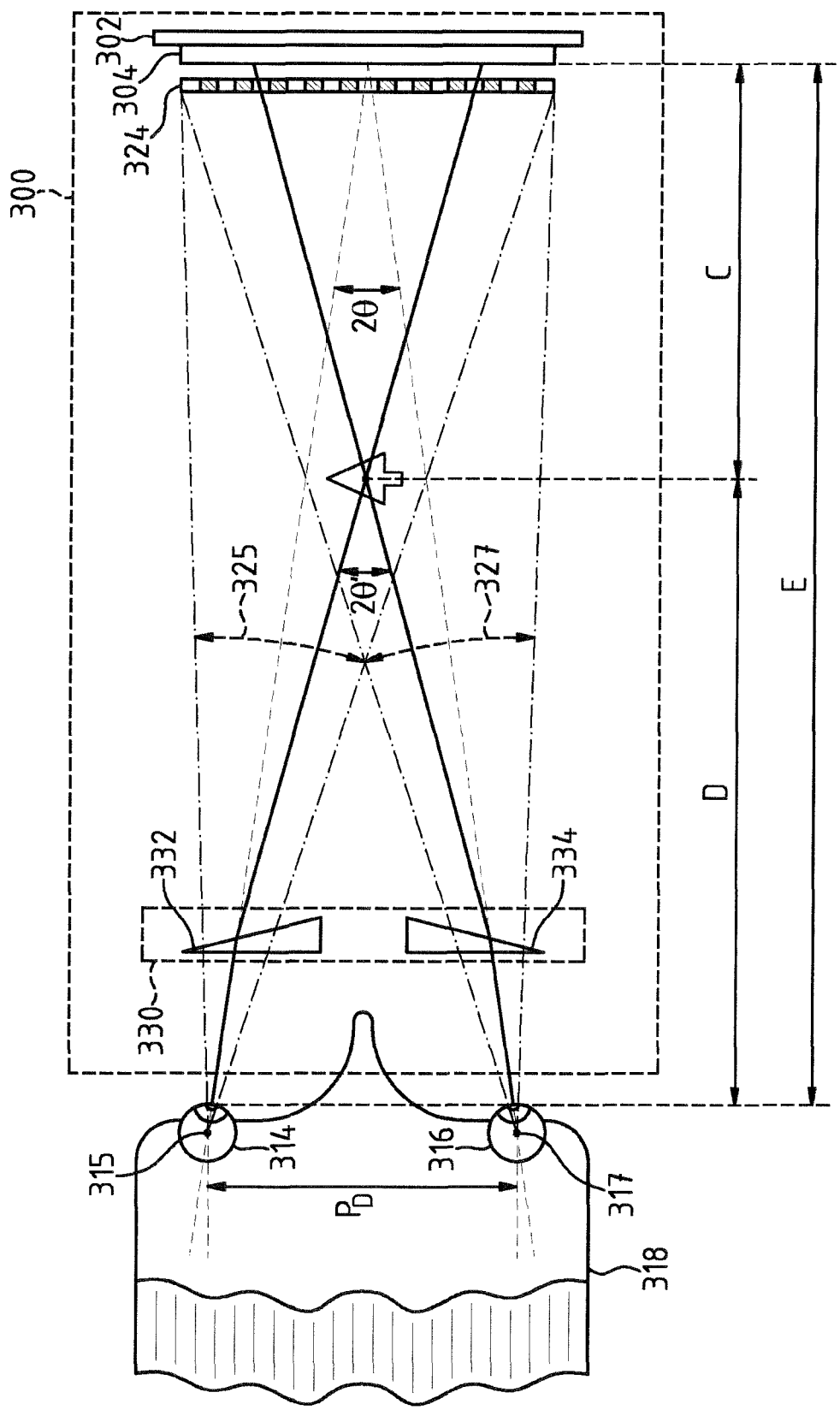
FIG. 5 shows a third system for stereoscopic visualization of three-dimensional image information on a display area with a parallax barrier.

FIG. 5 shows a third system 300 for stereoscopic visualization of image information. To the extent that the construction and the function of the system 300 correspond to the function and the construction of the system 100 explained previously with reference to FIGS. 1 and 2, the assemblies and elements illustrated in FIG. 5 are denoted by reference signs which are increased by the number 200 with respect to FIG. 1.

The system 300 includes an optical assembly 324 arranged on that side of the display device 302 which faces the observer 318, which optical assembly is configured as a parallax barrier. Such a display device 302 having a parallax barrier 324 for visualization of three-dimensional image information is described, for example, in U.S. Pat. No. 7,626,674, which is hereby referred to in its entirety. The parallax barrier 324 is then used to screen out the light emitted by the image points 110 of a partial image 106 which is on the left in FIG. 2 in an angle range 325, within which the light from the image points 112 of a partial image 108 which is shown on the right in FIG. 2 reaches the right eye 316. The parallax barrier 324 correspondingly screens out the light from the image points 112 of a partial image 110 which is shown on the right in FIG. 2, which reaches the left eye 314.

Figure 6:
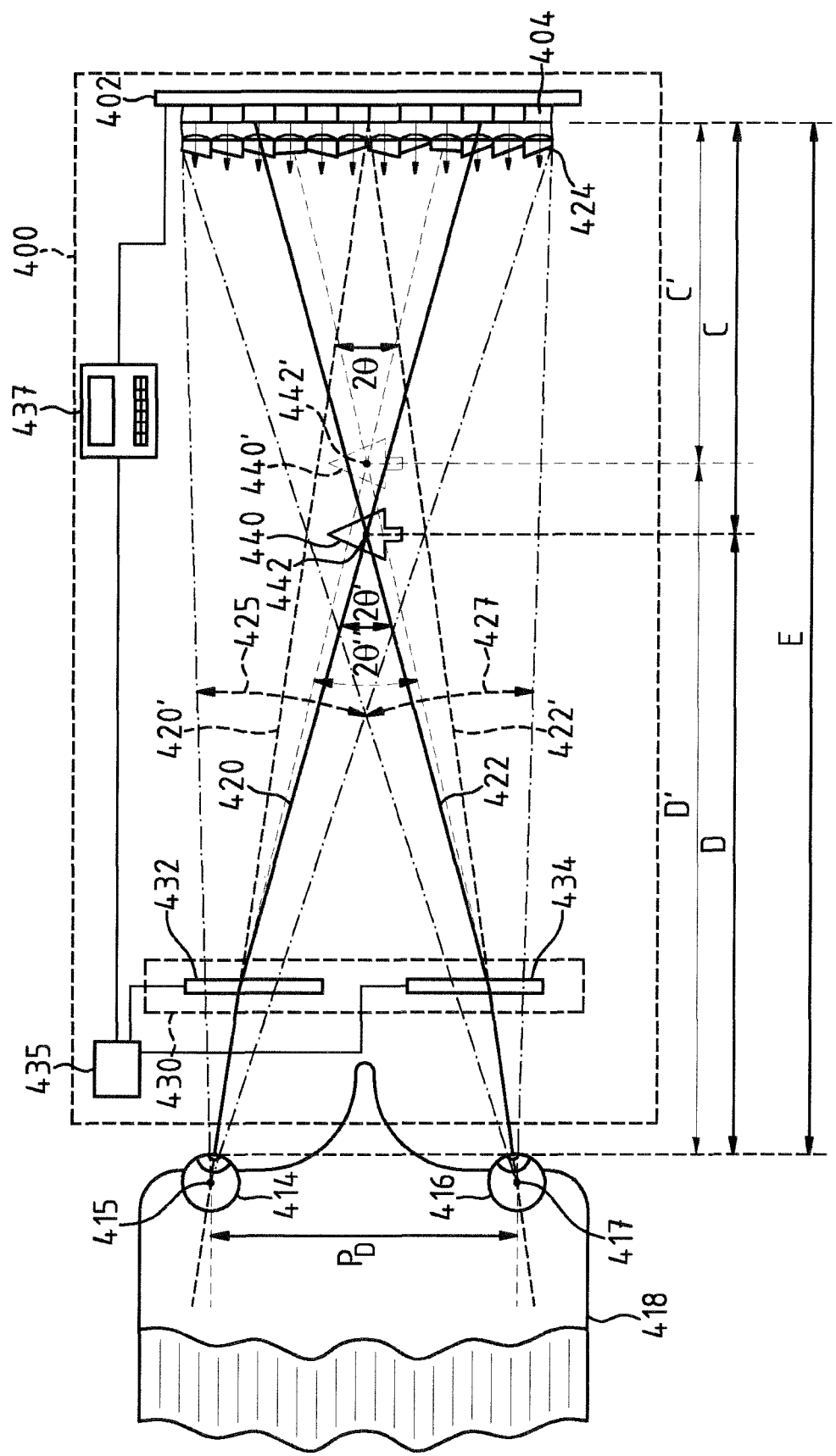
FIG. 6 shows a fourth system for stereoscopic visualization of three-dimensional image information on a display area with a prism matrix; and, FIG. 7 shows a fifth system for stereoscopic visualization of three-dimensional image information on a display area with a vision aid configured in the form of spectacles.

FIG. 6 illustrates a fourth system 400 for stereoscopic visualization of image information. To the extent that the construction and the function of the system 400 correspond to the function and the construction of the system 100 explained previously with reference to FIGS. 1 and 2, the assemblies and elements illustrated in FIG. 6 are denoted by reference signs which are increased by the number 300 with respect to FIG. 1.

The system 400 includes an optical assembly 424, which is arranged on that side of the display device 402 which faces the observer 418 and is configured as a prism matrix. The prism matrix 424 is used to guide the light emitted from the image points 110 of the left partial image 106 in an angle range 425 to the left observer eye 414. The right observer eye 416 receives the light emitted from the image points 112 of the right partial image 108 through the prism matrix 424 in the angle range 427.

The system 400 includes a vision aid 430 having an optical element configured as an electro-optical element 432 and an optical element configured as an electro-optical element 434, the prismatic effect ($P_{432}$, $P_{434}$) of which can be adjusted using a control device 435. The electro-optical elements (432, 434) can be configured for example as liquid-crystal elements. It is possible using the control device 435 to displace the intersection 440 of the left observation beam path 420 with the right observation beam path and thus match it to the position of a three-dimensional structure 442 displayed using the display device 402.

The control device 435 is connected to a computer unit 437 which includes an image control stage, with which the image points (110, 112) of a left and right partial image (106, 108) illustrated in FIG. 2 are controlled.

The computer unit 437 contains a computer program which generates a control variable for the prismatic effect P of the electro-optical element 432 and the electro-optical element 434 for the control device 435. Thus, the intersection 440 of the left and right observation beam paths (420, 422) is adjusted in dependence on the image information displayed using the display device 402. As indicated in FIG. 6 with the modified left and right observation beam paths (420', 422'), the intersection 440' with the associated stereo angle 2θ" here follows a displacement and change in the structure 442 to the structure 442'. Relaxed viewing for the observer 418 is therefore possible even if three-dimensional structures displayed on the display device 402 are moved in front of and behind the display area 404.

It should be noted that the system 400 in one modified embodiment can be configured with an optical assembly 430 which contains prisms as optical elements for adjusting the prismatic effect ($P_{432}$, $P_{434}$) in the left and right observation beam paths, which prisms can be rotated about the optical axis of the left and right observation beam paths (420, 422).

A further idea of the invention is to configure the vision aid in a system for stereoscopic visualization of image information such that it can be used to observe three-dimensional image information in a large field of vision. The horizontal image field angle ω, the appropriate distance E of an observer from the display area, and the width W of the display area of a display device for visualization of three-dimensional image information are listed in the following Table 5:

TABLE 5

| E[m] | W[m] | $\omega = 2\arctan\left(\dfrac{W}{2E}\right)[°]$ | Use |
|---|---|---|---|
| 3 | 1.8 | 33 | Home TV |
| 8 | 22 | 108 | IMAX |
| 0.6 | 0.7 | 61 | 27" TFT monitor |
| 0.3 | 0.3 | 53 | Games console |

If the stereoscopic image information is visualized in an IMAX dome, the following even applies for the image field angle ω: ω=180°.

Figure 7:
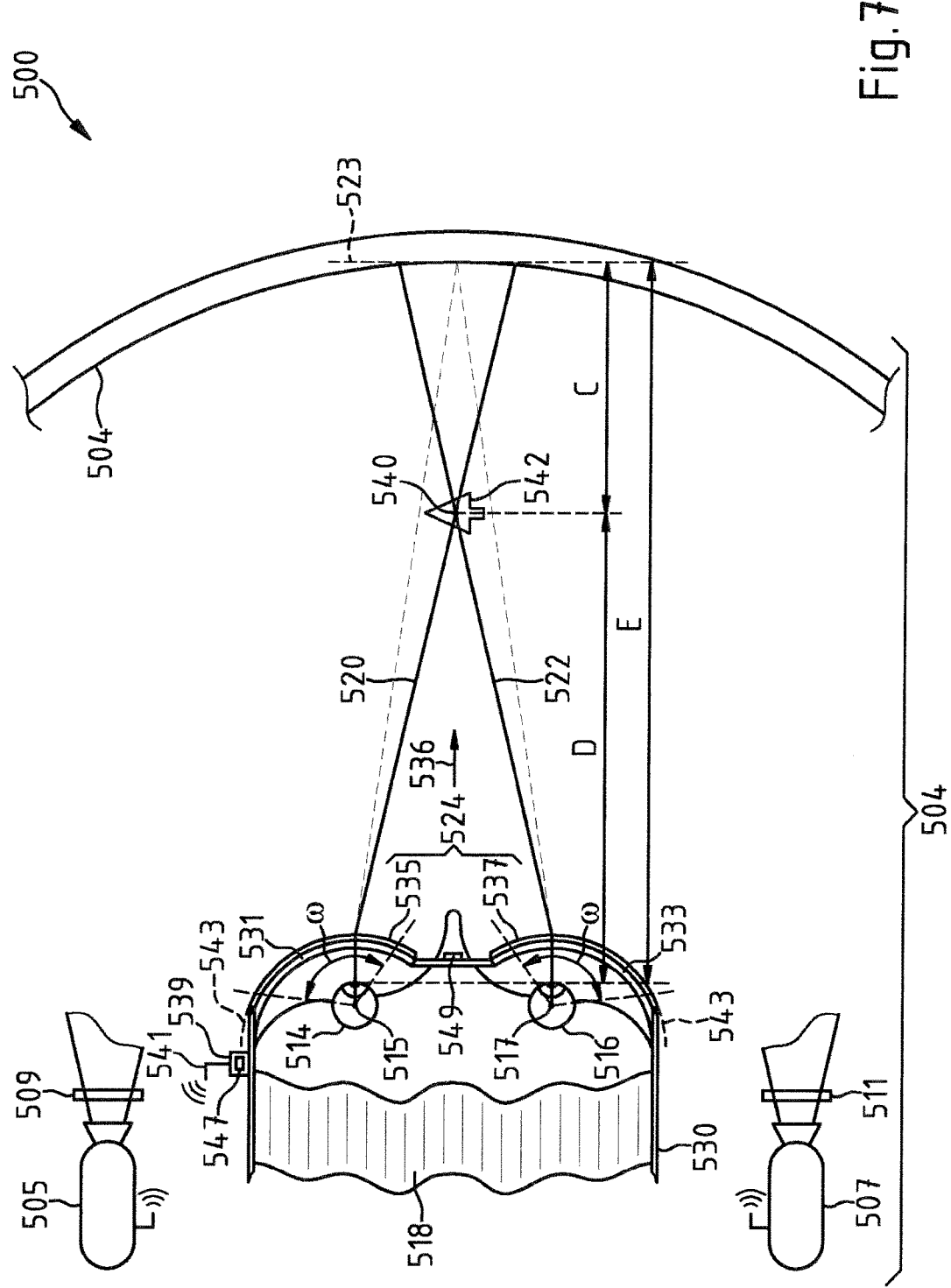

FIG. 7 illustrates a fifth system 500 for stereoscopic visualization of image information using a vision aid 530 with which the image area which is displayed in the display area 504 of a display device 502 which is configured in the shape of a dome on a corresponding IMAX dome can be viewed with a large image field angle.

To the extent that the construction and the function of the system 500 correspond to the function and the construction of the system 100 explained previously with reference to FIGS. 1 and 2, the assemblies and elements illustrated in FIG. 5 are denoted by reference signs which are increased by the number 400 with respect to FIG. 1.

The system 500 has a display device 502 with a dome-shaped display area 504. Projection devices (505, 507) are used to project according to what is known as the anaglyph method three-dimensional image information onto the dome-shaped display area 504, which image information is contained in a left and right partial image (106, 108), as is shown in FIG. 2. The anaglyph method is explained in detail on page 137 of the textbook "ABC der Optik," Mütze, Verlag Werner Dausien, 1960. The light of the projection device 505 is here guided through a red filter 509. The projection device 507 provides the light through a green filter 511. The red filter 509 and the green filter 511 are used to give the left and right partial images (106, 108) two different complementary colors.

The system 500 includes a vision aid configured as spectacles 530. In the system 500 the optical assembly 524 for splitting the light from the first group of display zones in the left observation beam path from the light the right observation beam path receives from the second group of display zones is integrated into the vision aid 530. The optical assembly 524 is here constructed with a red filter film 535 arranged on the spectacle lens 531 and a green filter film 537 positioned on the spectacle lens 533.

The spectacle lenses (531, 533) are configured as electro-optical elements. The spectacle lenses (531, 533) have a structure as described, for example, in United States patent application publication 2007/0081126 A1 with reference to FIGS. 7 and 8. Reference is made in this respect entirely to the disclosure of this document.

The spectacles 530 contain a control device 539 with which the refractive power and the prismatic effect ($P_{132}$, $P_{134}$) of the spectacle lenses (531, 533) can be adjusted. The refractive power of the spectacle lenses (531, 533) is controlled here such that the left and right observation beam paths (520, 522) have a shared focal plane 523. The spectacles 530 have a distance meter 549 connected to the control device 539, which distance meter acquires the distance E of an observer 518 from the display area 504. The control device 539 has a radio interface 541. The radio interface 541 is used to transfer information about the distance C from the display area 504, measured in the viewing direction of the observer 518, of a three-dimensional structure 542 of three-dimensional image information which is projected onto the display area 504 using the projection devices (505, 507) from the display device 502 to the control device 539.

The control device 539 has a computer unit 547. The computer unit 547 contains a computer program which determines the necessary refractive power and the necessary prismatic effect ($P_{532}$, $P_{534}$) of the spectacle lenses (531, 533), so that the observer 518 with observer eyes (514, 516), which are adapted to infinity, and a viewing direction corresponding to the eye state, can view the image information visualized using the display device 502 in a relaxed manner in a focal plane 523 which rests on the display area 504.

To this end, the computer unit calculates from the distance E the refractive index individually necessary for the observer 518 and ascertains the prismatic effect of the spectacle lenses (531, 533) using the following equation relationships:

$$P_{532} = 100\frac{\text{cm}}{\text{m}} \frac{P_D}{2} \cdot \frac{1}{D} \qquad (22)$$

-continued $$P_{534} = -100\frac{\text{cm}}{\text{m}}\frac{P_D}{2} \cdot \frac{1}{D}. \quad (23)$$

with $$D := E - C. \quad (24)$$

It is here made possible for an observer 518 to view with a left and right eye (514, 516) the three-dimensional image information displayed on the display area 504 with a left and right observation beam path (520, 522), which have a common intersection 540 with the distance C from the display area 504.

The spectacle lenses (531, 533) of the spectacles 530 make possible for the observer 518 a horizontal image field angle ω, which is ω=120°. To this end, the spectacles 530 are configured in the manner of sports goggles or protective goggles with a horizontal base curve 543, for which average curvature κ the following applies: κ≥6 dpt.

The spectacles 530 have spectacle lenses (531, 533) which cover the eye sockets of the observer 518. What is achieved by this measure is that the observer 518 can observe the dome-shaped display area 504 under a very wide image field angle ω, which is for example ω=120° or ω=180°.

In the system 500, the optical assembly 524 for splitting the light from the first group of display zones in the left observation beam path from the light the right observation beam path receives from the second group of display zones is integrated in the vision aid 530. The optical assembly 524 is here constructed with a red filter film 535 arranged on the spectacle lens 531 and a green filter film positioned on the spectacle lens 533.

It should be noted that in the system 500, image information corresponding to the system 100 in FIG. 1 can be displayed in principle also using polarized light. In this case, the spectacles 530 have no color filters but polarization filters in order to split the light of the display device 502 for the left and right observation beam paths (520, 522).

In summary, in particular the following preferred features of the invention should be noted: the invention relates to a system (100, 200) for stereoscopic visualization of image information. The system has a display device (102, 202), which has a display area (104, 204) for displaying a left and right partial image (106, 108, 206, 208). The display device (102, 202) provides the left partial image (106, 206) to a left eye (114, 214) of an observer (118, 218), focused on the display area (104, 204) in a first viewing direction using a left observation beam path (120, 220). The right partial image (108, 208) is displayed in a second viewing direction to a right eye (116, 216) of the observer (118, 218), which is focused on the display area (104, 204), using a right observation beam path (122, 222). The system (100, 200) contains a vision aid (130, 230) through which the left and/or right observation beam paths (120, 220, 122, 222) pass(es). The vision aid (130, 230) adjusts a beam course for the left and right observation beam paths (120, 122, 220, 222), in which beam course, starting from the left and right eyes (114, 116, 214, 216) in the direction (136, 236) facing the display area (104, 204), the perpendicular distance (A) of the left observation beam path (120, 220, 120', 220'), which continues to infinity, from the right observation beam path (122, 222), which continues to infinity, decreases. At a location (140, 240) arranged at a distance C from the display area (104, 204) in the left and right observation beam paths (120, 122), which continue to infinity, the distance A has a minimum.

It is understood that the foregoing description is that of the preferred embodiments of the invention and that various changes and modifications may be made thereto without departing from the spirit and scope of the invention as defined in the appended claims.

REFERENCE NUMERALS 100, 200 system
102, 202 display device
104, 204, 304, 404 display area
106, 108, 206, 208 partial image
107, 109, 207, 209 group
110, 112, 210, 212 image points
111, 113, 211, 213 display zone
114, 116, 214, 216 eye, observer eye
115, 117, 215, 216 eye's center of rotation
118, 218 observer
20, 120', 220, 220' observation beam path
122, 122", 222, 222' observation beam path
124, 224 optical assembly
26, 128 polarization filter
130, 230 vision aid
132, 134, 232, 234 prism
136, 236 direction
137, 237 location
140, 240 intersection, structure
142, 242 structure
144, 146 viewing direction
202 display device
206 partial image
210, 212 image point
26, 228 shutter
229 control device
232, 234 prism
244, 246 viewing direction
300 system
302 display device
314, 316 eye
318 observer
324 optical assembly
324 parallax barrier
325 angle range
400 system
402 display device
404 display area
414, 416 eye
418 observer
420, 422 observation beam path
420', 422' observation beam path
424 optical assembly, prism matrix
425, 427 angle range
430 vision aid
432, 434 element
435 control device
437 computer unit
440, 440' intersection
442, 442' structure
500 system
502 display device
504 display area
505, 507 projection devices
509 red filter
511 green filter 514, 516 eye
515, 517 eye's center of rotation
518 observer
520, 522 observation beam path
523 focal plane
524 optical assembly
530 vision aid, spectacles
531, 533 spectacle lenses
535 filter film
536 direction
537 filter film
539 control device
540 intersection
541 radio interface
542 three-dimensional structure
543, 545 base curve
547 computer unit
549 distance meter

What is claimed is:

1. A system for stereoscopic visualization of image information, the system comprising:
   a display device defining a display area for displaying a left partial image and a right partial image;
   said display device being configured to display the left partial image to a left eye of an observer focused on said display area in a first viewing direction using a left observation beam path and to display the right partial image to a right eye of the observer focused on said display area in a second viewing direction using a right observation beam path;
   a vision assist through which at least one of the left and right observation beam paths pass with said observation beam paths extending to infinity;
   said vision assist being configured to set a beam course for said left and right viewing observation beam paths wherein, starting from the left and right eyes in a direction toward said display area, a perpendicular distance (A) between said left and right observation beam paths decreases to a minimum at a location which is at a finite distance (C) from said display area;
   said first viewing direction and said second viewing direction converging on said display area;
   said display device being further configured to generate said left partial image with a first group of display zones disposed within said display area and to generate said right partial image with a second group of display zones disposed within said display area whereat said left and right partial images are mutually fused in part within a fusion region and to display said left and right partial images to the left and right eyes with said left and right observation beam paths;
   within said fusion region, at least some of said display zones of the first group being arranged adjacent to corresponding ones of at least some of said display zones of the second group;
   said system further comprising an optical assembly arranged in said left and right observation beam paths and configured to split the light in said left observation beam path coming from said first group of display zones from the light said left observation beam path receives from said second group of display zones to supply the light from said first group of display zones to the left eye and configured to split the light from said second group of display zones in said right observation beam path from the light said right observation beam path receives from said first group of display zones to supply the light from said second group of display zones to the right eye; and,
   wherein said optical assembly includes a diaphragm system acting as a parallax barrier for splitting the light of said first and second groups of selected display zones.

2. The system of claim 1, wherein said optical assembly is adjustable and configured to enable variation of the course of said left and right observation beam paths between said display area and the left and right eyes.

3. A system for stereoscopic visualization of image information, the system comprising:
   a display device defining a display area for displaying a left partial image and a right partial image;
   said display device being configured to display the left partial image to a left eye of an observer focused on said display area in a first viewing direction using a left observation beam path and to display the right partial image to a right eye of the observer focused on said display area in a second viewing direction using a right observation beam path;
   a vision assist through which at least one of the left and right observation beam paths pass with said observation beam paths extending to infinity;
   said vision assist being configured to set a beam course for said left and right viewing observation beam paths wherein, starting from the left and right eyes in a direction toward said display area, a perpendicular distance (A) between said left and right observation beam paths decreases to a minimum at a location which is at a finite distance (C) from said display area;
   said first viewing direction and said second viewing direction converging on said display area;
   said display device being further configured to generate said left partial image with a first group of display zones disposed within said display area and to generate said right partial image with a second group of display zones disposed within said display area whereat said left and right partial images are mutually fused in part within a fusion region and to display said left and right partial images to the left and right eyes with said left and right observation beam paths;
   within said fusion region, at least some of said display zones of the first group being arranged adjacent to corresponding ones of at least some of said display zones of the second group; said system further comprising an optical assembly arranged in said left and right observation beam paths and configured to split the light in said left observation beam path coming from said first group of display zones from the light said left observation beam path receives from said second group of display zones to supply the light from said first group of display zones to the left eye and configured to split the light from said second group of display zones in said right observation beam path from the light said right observation beam path receives from said first group of display zones to supply the light from said second group of display zones to the right eye; and,
   wherein said optical assembly comprises a prism matrix for splitting the light of said first and second groups of display zones; and, said prism matrix includes a plurality of prism portions extending in a vertical direction and said prism portions have respective lens-shaped regions with a convex surface facing said display area.

4. The system of claim 3, wherein said lens-shaped regions are cylindrical lens-shaped regions.

5. The system of claim 3, wherein said optical assembly is adjustable and configured to enable variation of the course of said left and right observation beam paths between said display area and the left and right eyes.

\* \* \* \* \*

UNITED STATES PATENT AND TRADEMARK OFFICE
CERTIFICATE OF CORRECTION

PATENT NO.        : 10,108,021 B2
APPLICATION NO.   : 14/495514
DATED             : October 23, 2018
INVENTOR(S)       : Pacher et al.

Page 1 of 1

It is certified that error appears in the above-identified patent and that said Letters Patent is hereby corrected as shown below:

In the Specification

In Column 5:
Line 66: delete "angle 2θ'" and substitute -- angle 2θ' -- therefor.

In Column 6:
Line 2: delete "angle 2θ" and substitute -- angle 2θ -- therefor.

In Column 8:
Line 24: delete "angle 2θ" and substitute -- angle 2θ -- therefor.

In Column 14:
Line 22: delete "20, 120', 220, 220' observation beam path" and substitute -- 120, 120', 220, 220' observation beam path -- therefor.

In Column 14:
Line 25: delete "26, 128 polarization filter" and substitute -- 126, 128 polarization filter -- therefor.

In Column 14:
Line 36: delete "26, 228 shutter" and substitute -- 226, 228 shutter -- therefor.

Signed and Sealed this
Twenty-sixth Day of February, 2019

Andrei Iancu
*Director of the United States Patent and Trademark Office*